United States Patent
Andrews et al.

[11] Patent Number: 6,151,549
[45] Date of Patent: Nov. 21, 2000

[54] SYSTEM FOR CONTROLLING ENGINE FUELING ACCORDING TO VEHICLE LOCATION

[76] Inventors: Eric B. Andrews, 16 Latchmoore Way, Bucks Gerrards Cross; Ed P. Hodzen, 4 Red House Close, Bucks Knotty Green, both of United Kingdom

[21] Appl. No.: 09/249,421

[22] Filed: Feb. 12, 1999

Related U.S. Application Data

[63] Continuation-in-part of application No. 08/922,961, Sep. 3, 1997, Pat. No. 5,983,156.

[51] Int. Cl.[7] .............................. G06F 19/00; B60T 7/18; F02M 51/00
[52] U.S. Cl. ......................... 701/115; 701/207; 701/213; 701/217; 701/218; 60/601; 180/167
[58] Field of Search .................................. 123/436, 478, 123/480, 486; 180/167, 168, 169; 701/1, 2, 25, 103, 104, 105, 115, 207, 213, 215, 217, 218, 219; 340/438, 439, 459, 825.3, 825.31, 425.5; 307/9.1, 10.1, 10.4, 10.5; 60/600, 601

[56] References Cited

U.S. PATENT DOCUMENTS

| | | |
|---|---|---|
| 4,468,928 | 9/1984 | Suzuki . |
| 4,787,043 | 11/1988 | Zimmerman et al. . |
| 4,926,335 | 5/1990 | Flowers et al. . |
| 4,938,195 | 7/1990 | Miyazaki et al. . |
| 5,210,540 | 5/1993 | Masumoto . |
| 5,265,025 | 11/1993 | Hirata . |
| 5,284,116 | 2/1994 | Richeson, Jr. ........................... 701/115 |
| 5,289,684 | 3/1994 | Yoshioka et al. . |
| 5,293,317 | 3/1994 | Adrain et al. ........................... 701/115 |
| 5,315,295 | 5/1994 | Fujii ........................................ 180/167 |
| 5,343,780 | 9/1994 | McDaniel et al. . |
| 5,434,574 | 7/1995 | Hayashi et al. . |
| 5,438,517 | 8/1995 | Sennott et al. . |
| 5,442,920 | 8/1995 | Kamel et al. . |
| 5,445,128 | 8/1995 | Letang et al. ........................... 123/436 |
| 5,446,665 | 8/1995 | Adrain et al. ........................... 701/115 |
| 5,531,200 | 7/1996 | Hosoe et al. ........................... 701/115 |
| 5,551,236 | 9/1996 | Zimmer et al. . |
| 5,638,790 | 6/1997 | Minowa et al. ......................... 123/436 |
| 5,646,857 | 7/1997 | McBurney et al. . |
| 5,657,232 | 8/1997 | Ishikawa et al. . |
| 5,742,922 | 4/1998 | Kim . |
| 5,749,346 | 5/1998 | Halvorson et al. ..................... 123/486 |
| 5,769,051 | 6/1998 | Bayron et al. .......................... 180/167 |
| 5,832,396 | 11/1998 | Moroto et al. . |
| 5,832,400 | 11/1998 | Takahashi et al. . |
| 5,884,210 | 3/1999 | Rettig et al. ............................ 701/115 |
| 5,983,156 | 11/1999 | Andrews ................................. 701/115 |

*Primary Examiner*—Willis R. Wolfe

[57] ABSTRACT

A system for controlling fueling of an internal combustion engine based upon vehicle position includes a receiver associated with the vehicle that is capable of receiving position and altitude information. The vehicle includes a control computer that delivers control signals to an engine fueling system, as well as to a turbocharger control system. The control computer includes a module that receives the altitude information and uses that information to evaluate changes in ambient air pressure that might detrimentally affect turbocharger speed. In one embodiment, the control computer reduces the fueling signal to reduce engine speed in relation to a decrease in ambient air pressure accompanying an increase in vehicle elevation. In another embodiment, the control computer uses the highly accurate altitude information together with engine speed information provides signals to the turbocharger control system.

17 Claims, 8 Drawing Sheets

SYSTEM FOR CONTROLLING ENGINE FUELING ACCORDING TO VEHICLE LOCATION

CROSS-REFERENCE

This application is a continuation-in-part to commonly-owned application Ser. No. 08/922,961 filed on Sep. 3, 1997, now U.S. Pat. No. 5,983,156.

BACKGROUND OF THE INVENTION

The present invention relates generally to systems and techniques for controlling fueling of an internal combustion engine, and more specifically to systems controlling engine fueling in accordance with information relating to vehicle location. A further aspect of the invention concerns a system and method for preventing an overspeed condition in a turbocharger when the engine is operating at higher altitude, lower ambient air pressure conditions.

It is presently known in the internal combustion engine industry, and particularly in the medium and heavy duty truck industry, to select engine fueling strategies based on presumed geographic conditions, wherein the geographic conditions are presumed from certain engine and/or vehicle operational parameters. In one known system, engine acceleration is monitored, presumed geographic conditions are determined therefrom and an appropriate one of a pair of fueling strategies is selected based upon the presumed geographic conditions. For example, during periods of continuous accelerations (i.e. stop and go traffic), the vehicle is presumed to be operating in or near a city, and a low emissions engine fueling map is selected for operation in accordance therewith. Conversely, during periods of steady state engine operation, the vehicle is presumed to be operating on an open highway, and a fuel economic engine fueling map is selected for operation in accordance therewith.

While engine fueling control systems of the foregoing type have been somewhat helpful in reducing emissions in areas designated by the Environmental Protection Agency (EPA) as non-attainment areas, they have several drawbacks associated therewith. For example, due to the engine acceleration-based determination of presumed geographic conditions, the foregoing system will typically select the fuel economic engine fueling map when driving on city freeways and beltways, thereby increasing vehicle emissions in or near low emissions urban areas.

As another example drawback, engine fueling control systems of the foregoing type typically switch to the fuel economic engine fueling map only after prolonged periods of steady state engine operation. Thus, during stops in rural areas, such as at weigh stations and toll booths, such systems typically revert to the low emissions fueling map. The same result occurs when the vehicle is in operation and the vehicle operator is required to interrupt steady state engine operation, such as when downshifting to negotiate a steep grade or when slowing down the vehicle in construction areas. In either case, fuel economy unnecessarily deteriorates.

As yet another drawback, known engine fueling control systems of the foregoing type provide for selection between only a fuel economic or a low emissions engine fueling map. However, either engine fueling map may be undesirable, or even counterproductive, under certain conditions requiring increased engine output (either via engine output power or engine output torque), such as when climbing steep grades. Increased engine output under such conditions would be advantageous in several respects. For example, vehicle operators would be grateful for increased engine output when driving through mountainous regions, and such increased output would reduce the need to down-shift, thereby reducing wear and tear on vehicle components. Moreover, such increased output would likely decrease transit time and allow vehicle operators to pass similarly rated vehicles while still maintaining good fuel economy. Further, vehicle purchasers could purchase lower rated engines and still get higher engine output when needed. The lower rated engines would resultantly last longer than the higher rated predecessor engines, and customer satisfaction would likely correspondingly increase.

In some cases, a vehicle engine is provided with a turbocharger that increases the intake airflow to the engine. In a typical turbocharger, a turbine is driven by the engine exhaust. The turbine is linked to a compressor section so that the compressor rotates as the turbine is driven. The compressor section draws in and compresses ambient air, with the compressor output being fed to the engine air intake manifold.

The rotational speed of the turbocharger is directly related to the flow rate of the engine exhaust, which is a function of engine speed. Since the turbocharger draws in ambient air, the speed of the device is also dependent upon the pressure of the air being drawn into the compressor section. For a given engine speed, the rotational speed of the turbocharger will increase as the pressure of the ambient air decreases.

As with any rotating machinery, the turbocharger has a maximum operational speed. Exceeding this speed can lead to failure, often catastrophic, of the turbocharger as the yield strength of the rapidly rotating components is exceeded. Ordinarily this characteristic of turbochargers does not pose a problem since the turbocharger is calibrated to withstand operation at the maximum engine operating power at altitudes below 10,000 ft.

However, problems arise when turbocharged engines are operated at high altitudes, where the ambient air pressure is less than at the sea level calibration pressure. At higher elevations, and consequently lower pressures, the turbocharger speed can exceed its limit speed when the engine is operating at or near its maximum rated power. Some known engine controllers rely upon an air pressure sensor mounted in the vehicle to determine the ambient air pressure. When the ambient pressure drops below a certain value, fueling to the engine is reduced, reducing the engine power or speed, and ultimately reducing the speed of the turbocharger.

One problem with this approach is that most on-board pressure sensors are accurate to only ±5 percent. An error of this magnitude is equivalent to an error of ±1000 ft. in the altitude of the vehicle. This sensor error can result in premature derating of the engine performance if the sensor reading is less than the actual ambient pressure. On the other hand, if the sensor reads a pressure that is greater than the true ambient pressure, the risk of turbocharger overspeed arises.

In addition to the accuracy problems associated with on-board pressure sensors, a further issue concerns the cost of the instrument. The typical pressure sensor can cost in the range of $10–20. Over an entire fleet of vehicles and through an expected number of sensor replacements, the overall cost of an on-board pressure sensor can become very high. Moreover, as with any engine-based sensor, ambient pressure sensors deteriorate and fail over time, which again yields a risk of turbocharger overspeed.

What is therefore needed is a system for controlling engine fueling, which overcomes the drawbacks of known engine fueling control systems. Ideally, such a system should control engine fueling based on actual (or somewhat accurately estimated) vehicle location/position. Such a system could dramatically reduce emissions in low emissions area and more accurately enable an appropriate engine fueling map regardless of the states, trends or statuses of engine/vehicle operational parameters. Such a system should further make available not only fuel economic and low emissions engine fueling maps, but should further provide for one or more higher output engine fueling maps to assist vehicle operators in hilly or mountainous regions.

A system is also needed that can accurately determine the ambient pressure for use in controlling the engine, and ultimately a turbocharger associated with the engine. Ideally, such a system would not require additional hardware or instruments. Moreover, the need extends to a system that is essentially immune to independent failure.

SUMMARY OF THE INVENTION

The foregoing shortcomings of the prior art are addressed by the present invention. In accordance with one aspect of the present invention, a system for controlling fueling of an internal combustion engine of a vehicle according to vehicle location comprises a receiver associated with a vehicle for receiving radio signals relating to vehicle location for determining a geographical location of the vehicle, means responsive to the geographical location of the vehicle for determining an engine fueling map corresponding to the geographical location of the vehicle, and a control computer providing the fueling signal to the fueling system according to the engine fueling map.

In accordance with another aspect of the present invention, a system for controlling fueling of an internal combustion engine of a vehicle according to vehicle location comprises a receiver associated with a vehicle for receiving radio signals relating to vehicle location, a fueling system responsive to a fueling signal to provide fuel to an internal combustion engine of the vehicle, a memory unit having a number of different engine fueling maps stored therein, and a control computer connected to the receiver, the fueling system and the memory unit. The control computer is responsive to the radio signals relating to vehicle location to determine therefrom a geographical location of the vehicle, retrieve from the memory unit an appropriate one of the engine fueling maps corresponding to the geographical location of the vehicle, and provide the fueling signal to the fueling system according to the appropriate one of the number of engine fueling map.

In a further feature of the invention, a system is provided for preventing turbocharger overspeed as the vehicle travels to higher altitudes. In one approach, the engine speed is reduced or the engine is derated to produce a commensurate reduction in turbocharger speed. In the preferred embodiment, the radio signals received by the vehicle include signals indicative of the altitude of the vehicle. A processor, preferably within the engine control computer, receives the altitude signal and accurately determines the ambient air pressure at that altitude. Deriving the ambient pressure from altitude signal produces a more accurate value to be used by the control computer. A more accurate air pressure value reduces the risk of derating the engine prematurely, or not derating the engine when the ambient pressure is within the range at which the turbocharger will spin beyond its limit rotational speed.

This ambient air pressure value is compared to a threshold pressure value indicative of a condition at which the turbocharger is susceptible to overspeed. If the ambient pressure value falls below this threshold value, the engine fueling system is commanded to reduce the quantity of fuel to the engine, which leads to a decrease in the speed of the turbocharger.

In another embodiment, rather than commanding a fuel reduction, the invention contemplates a system that commands the turbocharger wastegate valve. When the ambient air pressure falls below the predetermined threshold, the wastegate valve is opened to divert a portion of the engine exhaust away from the turbocharger, again reducing the speed of the turbocharger.

One object of the present invention is to provide a system for providing an internal combustion engine with a fueling map appropriate for a current location of the vehicle carrying the engine.

Another object of the present invention is to provide such a system including a memory unit having a number of engine fueling maps stored therein, wherein the system further includes a vehicle location determining unit and a control computer operable to retrieve an appropriate one of the number of engine fueling maps for the current geographical location of the vehicle.

A further object of the present invention is to provide such a system alternatively including a communications unit operable to communicate with a remote communications unit to receive either an appropriate engine fueling map therefrom or instructions therefrom to retrieve an appropriate engine fueling map from the memory unit.

Yet another object of the present invention is to provide such a system wherein the number of engine fueling maps includes at least a low emissions engine fueling map, a fuel economy engine fueling map and a high engine output engine fueling map.

Still another object of the present invention is to provide such a system wherein the low emissions engine fueling map is selected when the vehicle is operating in an urban geographical area, the fuel economy engine fueling map is selected when the vehicle is operating in a rural geographical area and the high engine output engine fueling map is selected when the vehicle is operating in a geographical area having inclined road grades.

A further object is addressed by features of the invention that control engine fueling as a function of altitude. A more particular object is to control engine power at higher altitudes to eliminate the risk of turbocharger overspeed.

These and other objects of the present invention will become more apparent from the following description of the preferred embodiments.

DESCRIPTION OF THE PREFERRED EMBODIMENTS

Figure 1:
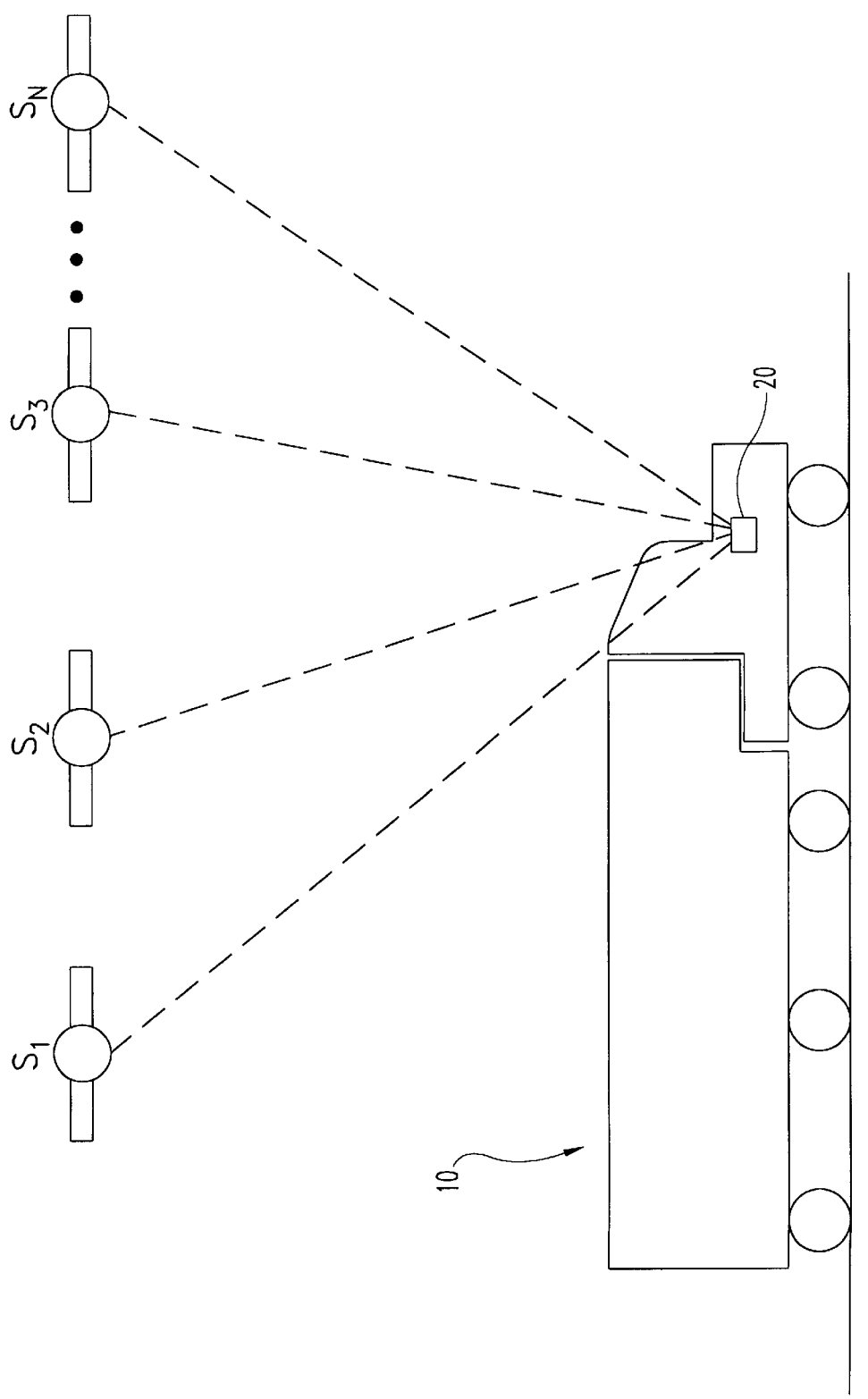
FIG. 1 is a diagrammatic illustration of a motor vehicle equipped with a receiver for receiving geographical position/location information, in accordance with one aspect of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alternations and further modifications in the illustrated devices, and such further applications of the principles of the invention as illustrated therein being contemplated as would normally occur to one skilled in the art to which the invention relates.

Referring to FIG. 1, a motor vehicle 10, such as a tractor truck-trailer combination, is shown including a vehicle position receiver 20 for receiving radio frequency signals indicative of vehicle position, in accordance with the present invention. In a preferred embodiment, vehicle position receiver 20 is a known Global Position Satellite (GPS) signal receiver operable to receive GPS signals broadcast by a number n of earth orbiting satellites $S_1$–$S_n$. Presently, 24 such earth orbiting satellites $S_1$–$S_{24}$ are in orbit above North America, wherein each satellite continuously broadcasts radio frequency signals, and wherein the satellites are arranged relative to each other such that at signals from at least three satellites are detectable anywhere in North America. In accordance with know GPS technology, the radio signals from at least three such satellites may be received and processed by known GPS receiving systems to determine the present geographical coordinates of the system with a high degree of accuracy.

A similar satellite-based system, GLONAS, is also currently in place over Russia and much of Western Europe and operates in a substantially similar manner to the GPS system. Thus, while vehicle position receiver 20 is shown and described above as a GPS receiver, those skilled in the art will recognize that receiver 20 may alternatively be a known GLONAS receiver operable to receive GLONAS position signals broadcast by GLONAS satellites. In another alternative embodiment, vehicle position receiver 20 may be a know LORAN-C receiver operable to receiver LORAN-C signals from a LORAN-C based position system as is known in the art. As it relates to the present invention, however, those skilled in the art will appreciate that position signal receiver 20 may be any receiver operable to receive broadcast signals from a suitable broadcast system and from which present vehicle position may be computed or estimated in accordance with known techniques.

Figure 2:
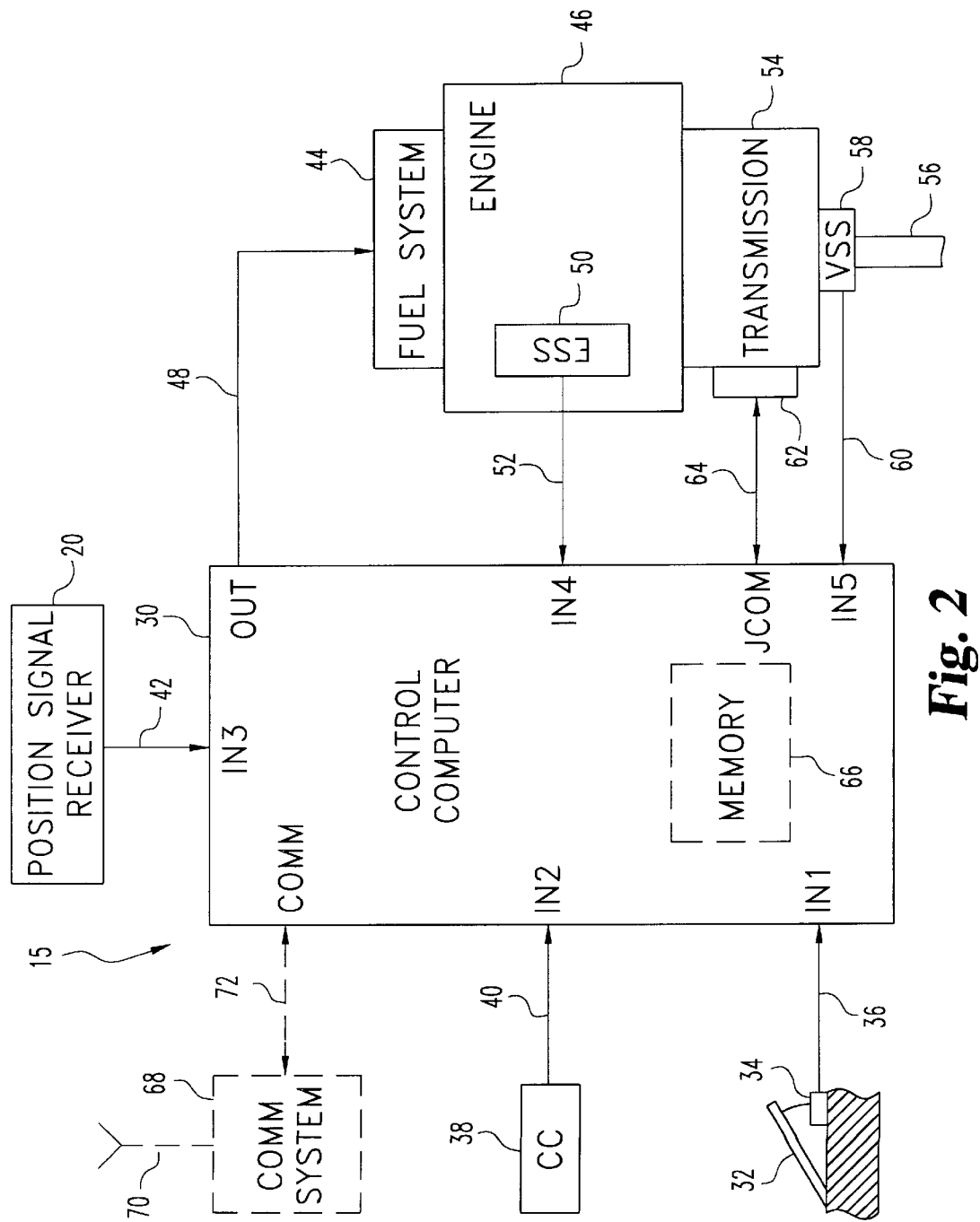
FIG. 2 is a diagrammatic illustration of one preferred embodiment of an engine control system for controlling engine fueling according to vehicle location, in accordance with another aspect of the present invention.

Referring now to FIG. 2, an internal combustion engine control system 15 is shown connected to the vehicle position signal receiver 20, and is operable to determine an appropriate engine fueling map corresponding to current vehicle location, in accordance with the present invention. As used herein, the term "engine fueling map" includes any mathematical function, table of values or the like mapping engine fueling requests to appropriate fuel quantities, fuel injection timing, and the like. Central to system 15 is a control computer 30 which has an input IN3 connected to vehicle position signal receiver 20 via signal path 42, and further interfaces with various motor vehicle components as will be described more fully hereinafter. Control computer 30 is preferably microprocessor-based and includes a memory 66, digital I/O, a number a analog-to-digital (A/D) inputs at least one communications port (COMM) such as a DUART.

The microprocessor portion of control computer 30 runs software routines, manages the overall operation of system 15, and is, in one embodiment, a Motorola 68336 or equivalent microprocessor. However, the present invention contemplates using any one of a number of known microprocessors capable of managing and controlling system 15.

The memory portion 66 of control computer 30 may include ROM, RAM, EPROM, EEPROM, FLASH MEMORY and/or any other reusable type of memory known to those skilled in the art. Memory 66 may further be supplemented by external memory connected thereto (not shown).

System 15 further includes a cab-mounted accelerator pedal 32 which includes a sensor 34 operable to produce an accelerator signal indicative of accelerator pedal deflection, which signal is provided to input IN2 of control computer 30 via signal path 36. In one embodiment, sensor 34 is a potentiometer producing a dc voltage level on signal path 34 indicative of accelerator pedal position or deflection, although the present invention contemplates that other known sensors may be alternatively associated with accelerator pedal 32 to provide an analog or digital signal or signals on signal path 34 is/are processed by control computer 30, as is known in the art, to determine a quantity indicative of driver requested torque.

System 15 further includes a known cruise control system 38 connected to input IN2 of control computer 30 via signal path 40. As is known in the art, control computer 30 is responsive to one or more cruise control signals provided on signal path 40 when cruise control system 38 is active to determine a quantity indicative of cruise control requested torque. As is known in the art, control computer 30 is responsive to the driver requested torque and cruise control torque quantities, as well as other engine and vehicle related parameters, to determine engine fueling rates from an engine fueling map stored in memory 66.

System 15 further includes a known engine fueling system 44 operatively associated with an internal combustion engine 46 of vehicle 10, and connected to output OUT of control computer 30 via signal path 48. Engine 46 includes an engine speed and/or position sensor 50 that is connected to input IN4 of control computer 30 via signal path 52. Engine speed sensor 46 is preferably a Hall Effect device operable to sense speed and/or position of a toothed gear rotating synchronously with the engine crank shaft. However, the present invention contemplates that engine speed sensor 50 may be any other known sensor, such as a variable reluctance sensor for example, operable to sense engine rotational speed and provide an engine speed signal to control computer 30 via signal path 52 corresponding thereto. Control computer 30 and engine speed sensor 50 comprise a known closed-loop control system whereby control computer is responsive to torque request signals provided by accelerator pedal 26 and/or cruise control system 38, the engine speed signal provided on signal path 52 and other known signals, to process such signals in accordance with an engine fueling map stored in memory 66 and provide an engine fueling signal corresponding thereto to fuel system 44 via signal path 48. Preferably, known closed-loop control techniques, such as proportional-integral-derivative (PID) techniques and the like, are used to produce the engine fueling signal provided on signal path 48.

System 15 further includes a transmission 54 operatively connected to engine 46 as is known in the art, wherein transmission 54 may be a manual, automatic or manual/automatic transmission having a number of selectable gear ratios. A propeller shaft, or tailshaft, 56 extends from transmission 54, and a vehicle speed sensor 58 is preferably connected thereto. Vehicle speed sensor 58 is connected to input IN5 of control computer 30 via signal path 60 corresponding thereto. Vehicle speed sensor 58 is preferably a variable reluctance sensor, although the present invention contemplates that sensor 58 may be any known sensor operatively associated with any suitable vehicle component to provide a vehicle speed signal to control computer 30 via signal path 60 indicative of vehicle speed.

As is particularly well known in the tractor truck industry, transmission 54 may typically include a separate microprocessor-based auxiliary computer 62 connected to a communications port JCOM of control computer 30 via a communications bus 64. Preferably, communications bus or datalink 64 is an SAE (Society of Automotive Engineers) J1939 two-wire bus and operates in accordance with the technical specifications set forth in the SAE J1939 bus industry standard. According to the SAE J1939 industry bus standard, control computer 30 and auxiliary computer 62 are operable to send and receive information relating to engine, vehicle and/or transmission operation. Thus, all information available on datalink 64 is available not only to control computer 12 but to auxiliary computer 62 as well. Those skilled in the art will therefore recogize that auxiliary computer 62 may alternatively be operable to compute some or all of the engine fueling information discussed above, and provide such information to control computer 30 for controlling fuel system 44.

As shown in phantom in FIG. 2, system 15 may optionally include a two-way wireless communication system 68 having an antenna 70 connected thereto, wherein system 68 is connected to a communications port COMM of control computer 30 (or alternatively to auxiliary computer 62) via signal path 72. As will be discussed in greater detail hereinafter, communications system 68 may be used to communicate data with another computer system. In one embodiment, communications system 68 is a cellular telephone transceiver operable to transmit/receive data from/to control computer 30 (and/or auxiliary computer 62) to/from to remote computer. Alternatively, communications systems 68 may be an RF transceiver or a satellite communications transceiver operable as described with respect to the cellular telephone transceiver embodiment.

Figure 3:
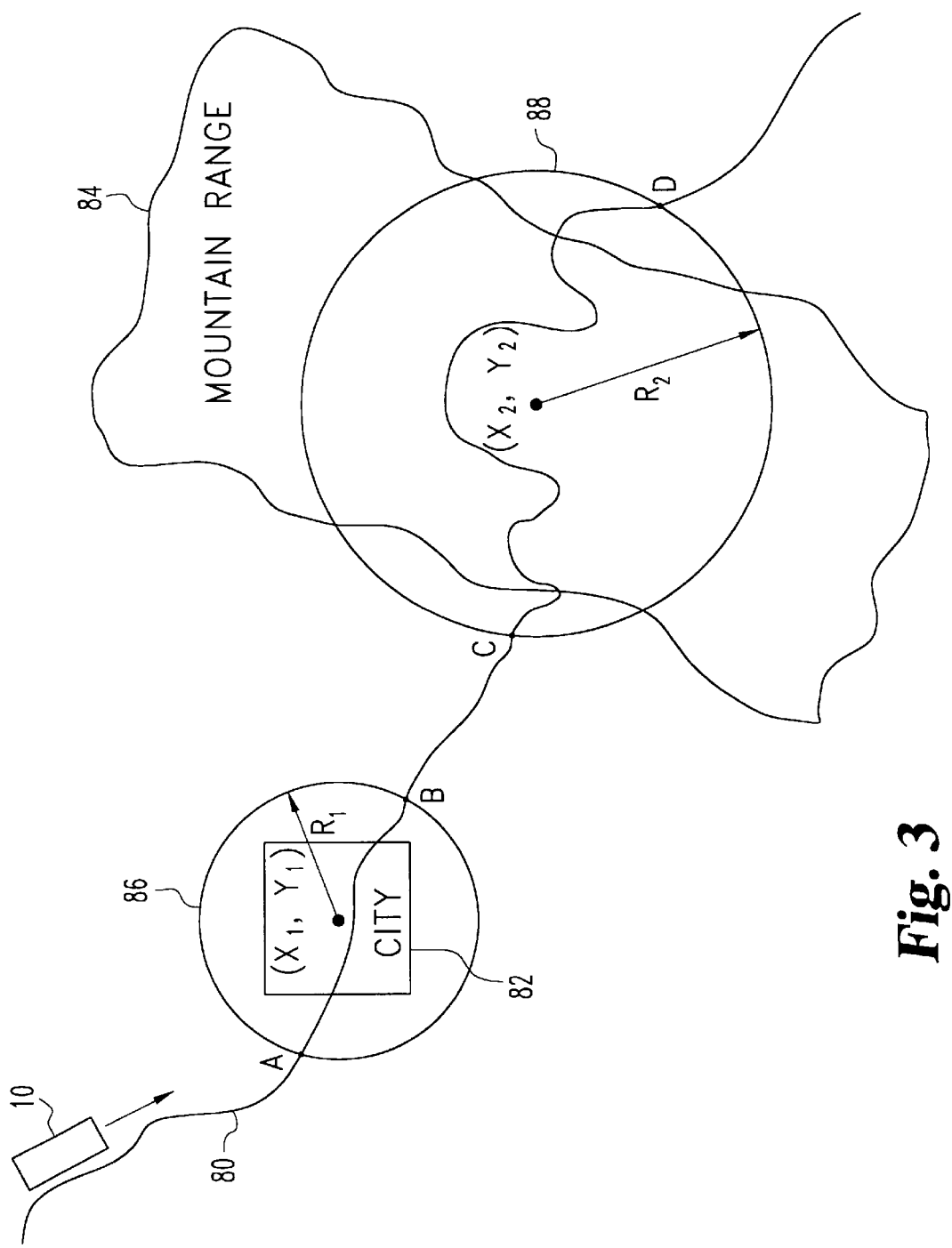
FIG. 3 is a diagrammatic illustration of a road extending through geographical areas having differing engine fueling strategies associated therewith, in accordance with the present invention.

Referring now to FIG. 3, operation of system 15, in accordance with one embodiment of the present invention, will be described in detail. FIG. 3 illustrates an example geographical map having a road 80 extending through a city 82 and a mountain range 84, with vehicle 10 (including system 15 of FIG. 2) traveling there along. In the example shown, an urban geographical region or area 86 surrounds the city 82, a hilly geographical region or area 88, i.e. a geographical area in which road 80 includes inclined road grades, surrounds the mountain range 84, and all other geographical areas through which road 80 passes define rural areas. In accordance with the present invention, system 15 is preferably operable to fuel engine 46 according to a low emissions engine fueling map whenever the vehicle 10 is operating in an urban area, to fuel engine 46 according to a fuel economy engine fueling map whenever the vehicle 10 is operating in a rural area, and to fuel engine 46 according to a high engine output engine fueling map whenever the vehicle 10 is operating in an area having inclined road grades. In the example map of FIG. 3, system 15 is thus operable to fuel engine 46 according to a low emissions engine fueling map as long as the vehicle 10 traveling within geographical area 86, to fuel engine 46 according to high engine output engine fueling map as long as the vehicle 10 is between points C and D of geographical area 88, and to fuel engine 46 according to a fuel economy engine fueling map.

In carrying out the above-described operation, system 15 preferably includes a number of engine fueling maps within memory 66, wherein the number of engine fueling maps includes at least one low emissions engine fueling map, at least one fuel economy engine fueling map and at least one high engine out put engine fueling map. Memory 66 further preferably includes maps, tables or mathematical functions of geographical areas or regions with engine fueling map indicators associated therewith. It will be appreciated by those skilled in the art that any known technique may be used to partition geographical territories into the various geographical regions or areas of interest for purposes of the present invention. For example, in accordance with one preferred embodiment of the present invention, geographical regions or areas corresponding to low emission areas and high engine output areas, such as areas 86 and 88 for FIG. 3, are defined as circles having predefined center point geographical coordinates and predefined radii, and all areas outside of such geographical circles correspond to fuel economy areas. Thus, geographical area 86 (low emissions area) has a geographical center point of $(X_1, Y_1)$ and a radius of $R_1$), and geographical area 88 (high engine output area) has a geographical center point of $(X_2, Y_2)$ and a radius of $R_2$. It will be understood, however, that other geometric shapes, as will be understood, however, that other geometric shapes, as well as local, national or international borders, could be used to define the geographical regions or areas of interest, and/or that geographical areas corresponding to fuel economy areas could alternatively be defined by area boundaries.

A number of known techniques exist for determining whether the present vehicle position is located within (or outside of) the boundaries defined by the geographical regions or areas of interest, and any one of more of such known techniques may be used for purposes of the present invention. For example, in accordance with one embodiment of the present invention, memory 66 preferably includes one or more geographical engine calibration tables including at least the latitudinal and longitudinal coordinates and radii of each geographical circle of interest along with a particular one of the number of available engine fueling maps corresponding thereto. Table 1 illustrates an example of one such table for the geographical territory shown in FIG. 3, although it is to be understood that the present invention contemplates providing the information shown therein in other forms, such as a mathematical equation, for example.

TABLE 1

GEOGRAPHICAL ENGINE CALIBRATION TABLE

| Latitude | Longitude | Radius | Engine Fueling Map |
|----------|-----------|--------|--------------------|
| $x_1$    | $Y_1$     | $R_1$  | Low Emissions      |
| $x_2$    | $Y_2$     | $R_2$  | High Engine Output |

Figure 4:
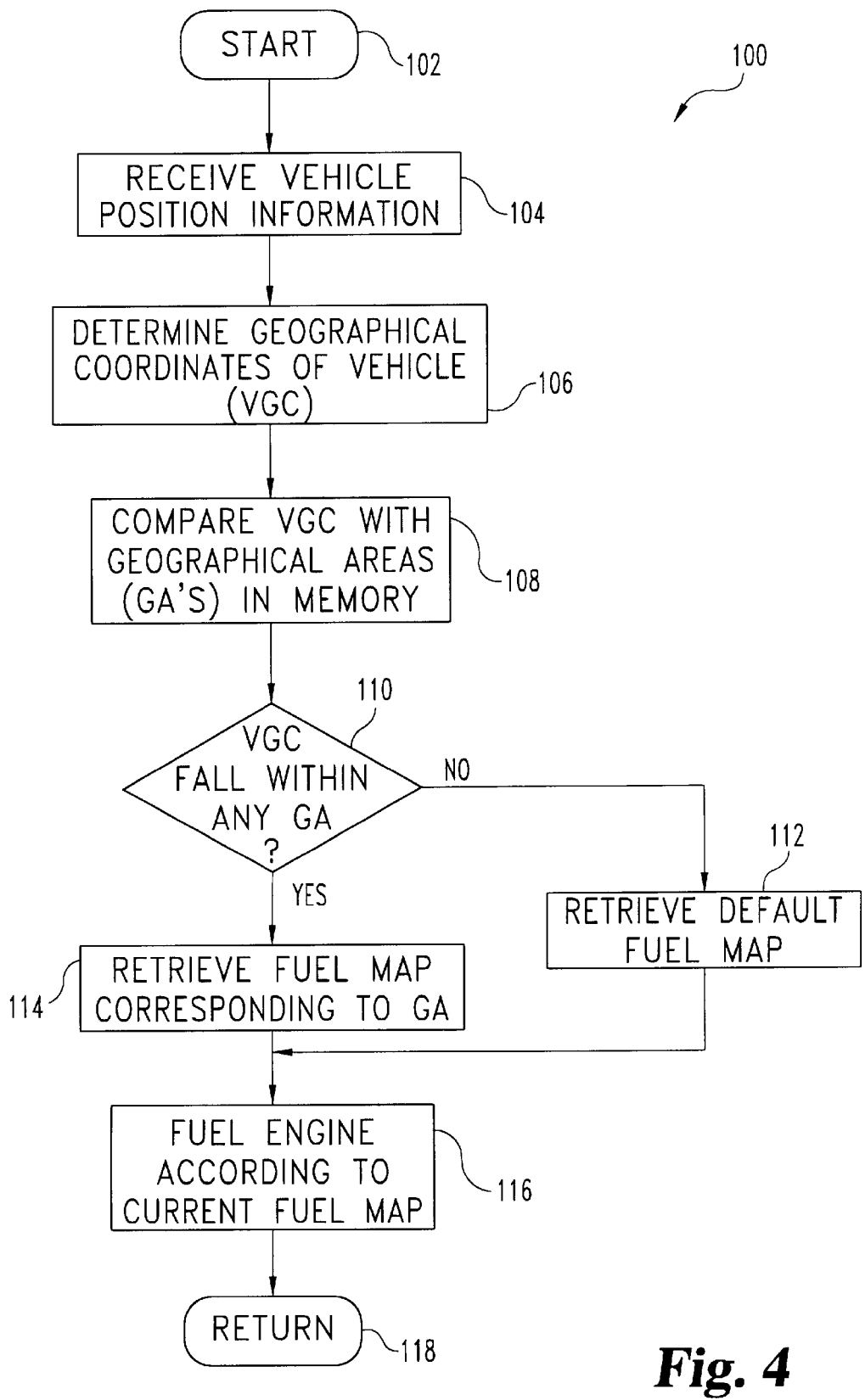
FIG. 4 is a flowchart illustrating one preferred embodiment of a software algorithm for controlling engine fueling according to vehicle location, in accordance with yet another aspect of the present invention.

Referring now to FIG. 4, a flowchart is shown illustrating one preferred embodiment of a software algorithm executable by control computer 30 (or auxiliary control computer 62) for selecting appropriate engine fueling maps based on vehicle location. The algorithm 100 begins at step 102 and at step 104, vehicle position signal receiver 20 receives vehicle position information in accordance with any of the radio signal techniques described hereinabove. Thereafter at step 106, control computer 30 determines the present vehicle geographical coordinates (VGC). In accordance with one preferred mode of operation of system 15, vehicle position receiver 20 is operable to continuously receive GPS or other such radio signals as described hereinabove. Receiver 20 may include circuitry for decoding such signals, in which case receiver 20 is operable at step 106 to periodically or continuously pass latitudinal and longitudinal (and optionally altitudinal and time) coordinate data to control computer 30 corresponding to present vehicle geographic coordinates (VGC), or receiver 20 may alternatively pass the received radio information to control computer 30 in which case control computer 30 is operable at step 106 to decode such information into the vehicle geographical coordinate (VGC) data.

In either case, algorithm execution continues from step 106 at step 108 when control computer 30 is operable to compare the present vehicle geographic coordinates (VGC) with the data stored in memory 66 relating to the geographical regions or areas (GA) of interest. As discussed hereinabove, many techniques are known and can be accordingly used to carry out such a comparison in step 108, although if a Geographical Engine Calibration Table such as Table 1 is used, control computer 30 preferably determines whether any of the distances between the present vehicle location coordinates and any of the geographical circle center coordinates are less than or equal to the corresponding circle radius value.

Algorithm execution continues from step 108 at step 110 where control computer 30 tests whether the present vehicle geographic coordinates (VGC) fall within any of the geographic regions or areas (GA) of interest, as a result of the comparisons of step 108. If not, then algorithm execution continues at step 112 where control computer 30 retrieves a default fuel map from memory 66. In accordance with the partitioning of the geographic territory illustrated in Table 1, if the current vehicle location does not fall within any of the geographic circles of interest, then the vehicle is presumed to be operating in a rural area and the default engine fueling map is therefore a known fuel economy engine fueling map. Algorithm execution continues from step 112 at step 116.

If, at step 110, control computer 30 determines that the vehicle 10 is presently located within one of the geographic regions or areas (GA) of interest, control computer 30 retrieves an engine fueling map from memory 66 appropriate for the geographical region or area of interest at step 114. For example, with reference to Table 1, if control computer 30 determines at step 110 that the vehicle 10 is presently located within area 86 (FIG. 3), then control computer 30 retrieves, at step 114, a known low emissions engine fueling map. If, however, control computer 30 determines at step 110 that the vehicle 10 is presently located within area 88 (FIG. 3), then control computer 30 retrieves, at step 114, a known high engine output engine fueling map. In one embodiment of the present invention, the high engine output engine fueling map is a high engine output power engine fueling map, while an alternative embodiment, the high engine output engine fueling map is a high engine torque engine fueling map. In any case, algorithm execution continues from either of steps 112 or 114 at step 116 where control computer 30 is operable to fuel the engine 46, as discussed hereinabove, according to the fueling map retrieved in either of steps 112 or 114. Algorithm execution continues from step 116 at step 118 where algorithm execution returns to its calling routine (or alternatively routes back to step 104).

Figure 5:
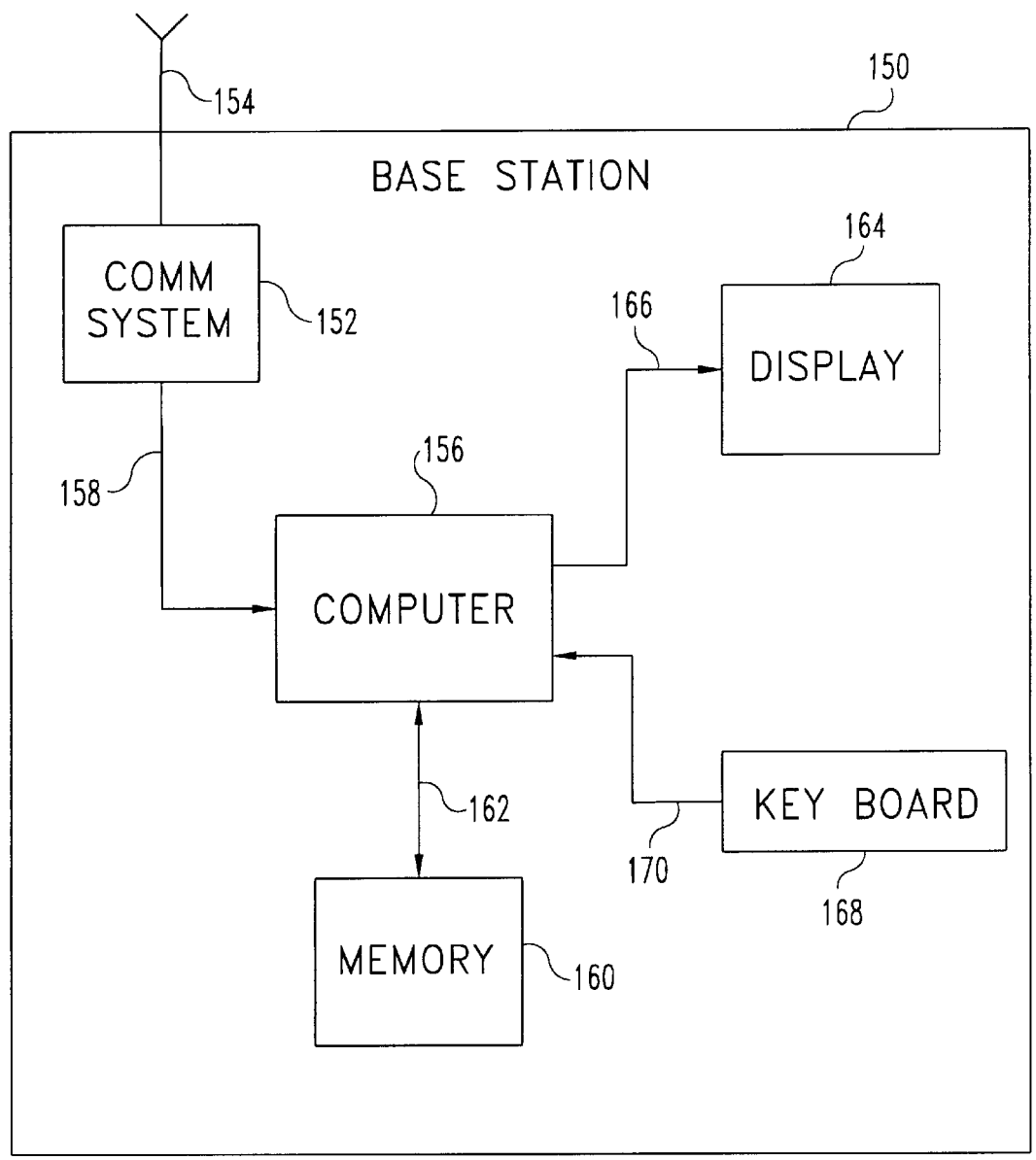
FIG. 5 is a diagrammatic illustration of one preferred embodiment of a base station for communicating with a mobile vehicle in accordance with an alternate embodiment of the engine control system of the present invention.

Referring now to FIG. 5, one embodiment of a base station 150, in accordance with another aspect of the present invention, is shown. Base station 150 is preferably a fixed position station having a control computer 156 connected to a communication system 152 via signal path 158, wherein communications system 152 is also connected to an antenna 154. As with optional communications system 68 illustrated in FIG. 2, communications system 152 may be a cellular telephone transceiver, a radio frequency transceiver or a satellite communications transceiver, although it should be understood that the two communications systems 68 and 152 must be compatible in their types of communication technology to thereby permit control computer 30 (or auxiliary control computer 62) to communicate with control computer 156 via system 68 and 152. Base station 150 further includes a memory unit 160 connected to control computer 156 via signal path 162, wherein memory unit may be internal to computer 156 or may comprise a known diskette memory or CD ROM memory, for example. Station 150 preferably further includes a display unit 164 connected to computer 156 via signal path 166 and a keyboard or other known user input means 168 connected to computer 56 via signal path 170.

If system 15 is equipped with optional communication system 68, system 15 may, in an alternative embodiment of the present invention, receive some or all of the vehicle geographical coordinate (VGC), geographical region or area of interest (GA) information and/or engine fueling rate map information from a remote computer such as base station control computer 156. In accordance with one alternative embodiment of the present invention utilizing base station 150, control computer 30 (or auxiliary control computer 62) is operable to determine the vehicle geographical coordinates (VGC) as discussed hereinabove with respect to steps 104 and 106 of algorithm 100, and provide such data to control computer 156 of base station 150. In so doing, control computer 30 is operable to provide the vehicle geographic coordinate data to communications transceiver 68 in a known manner, wherein transceiver 68 is operable under the direction of either control computer 30 or control computer 156 to transmit such data to communication transceiver 152 of base station 150. The vehicle geographic coordinate data received by transceiver 152 is then passed to control computer 156, wherein control computer 156 is operable as discussed hereinabove to carry out either steps 108–114 or alternatively only steps 108–110 of algorithm 100. In either case, the geographical regions or areas (GA) and/or engine fueling maps in memory may be contained within computer memory 160 or may alternatively be contained within an external memory device such as a diskette or CD ROM. Alternatively, control computer 30 may simply pass the radio signal information from vehicle position receiver 20 directly to the base station control computer 156 so that control computer 156 is operable to additionally carry out step 106 of algorithm 100.

If control computer 156 is programmed to carry out all of steps 108–114, control computer 156 is operable to provide data relating to an appropriate fueling map to communications transceiver 152. If, on the other hand, control computer 156 is programmed to carry out only steps 108–110, control computer 156 is operable to provide data relating to which of the plurality of engine fueling maps within memory 66 to retrieve. In either case, transceiver 152 is operable, under the direction of either control computer 156 or control computer 30, to transmit the data provided thereto to transceiver 68 of system 15. Such data received by transceiver 68 is passed to control computer 30 (or auxiliary control computer 62) and, if such data represents an engine fueling map, control computer 30 (or auxiliary computer 62) is operable to carry out step 116 of algorithm 116 by fueling the engine 46 according to the engine fueling map data. If, on the other hand, such data represents an engine fueling map indicator, control computer 30 (or auxiliary computer 156) is operable to carry out steps 112, or 114 and step 116 of algorithm 100 by first retrieving an appropriate engine fueling map from memory 66 according to the engine fueling map indicator provided thereto by control computer 156, and then fueling the engine 46 according to the selected engine fueling map.

Figure 6:
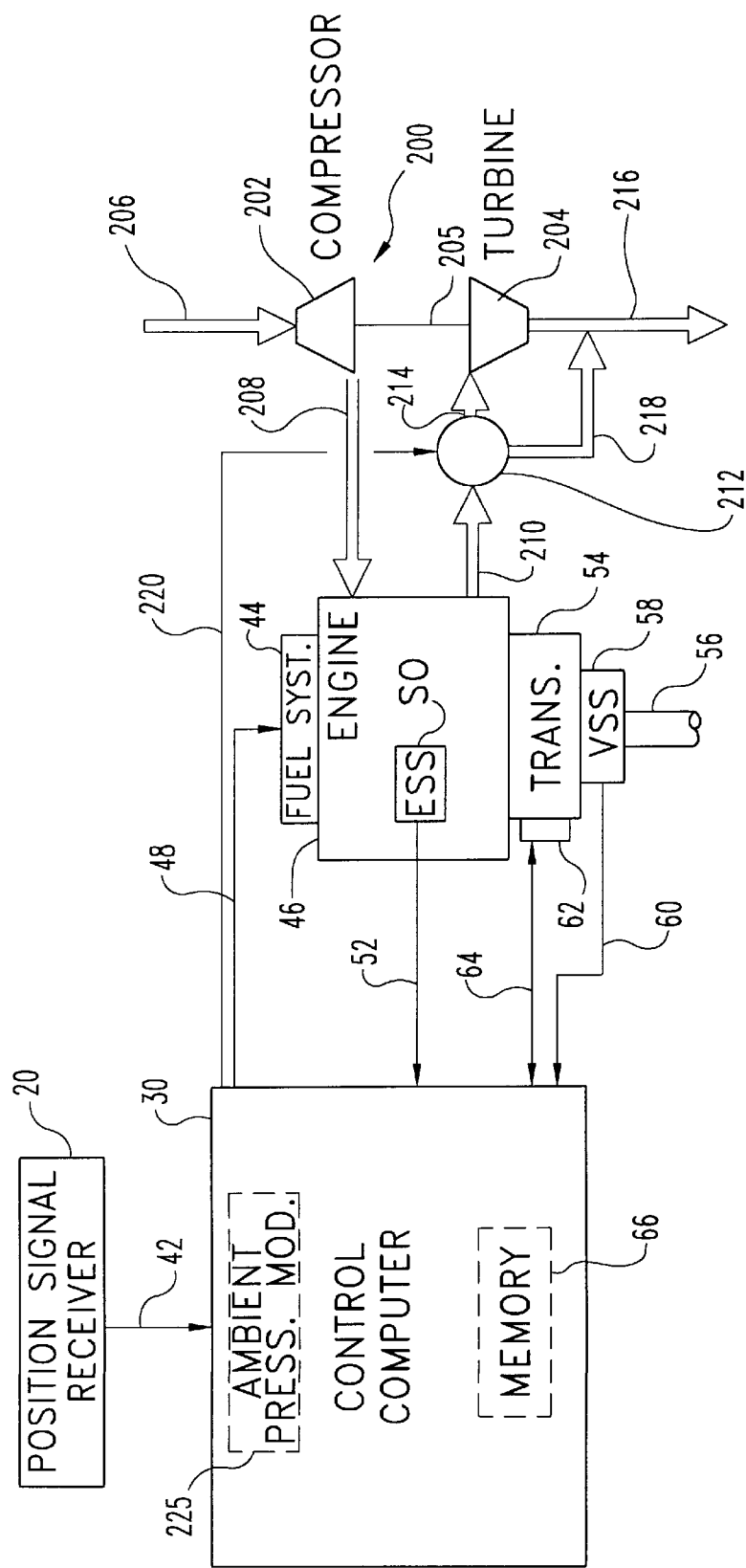
FIG. 6 is a diagrammatic illustration of another embodiment of an engine control system for controlling a turbocharged engine according to vehicle altitude, in accordance with a further feature of the present invention.

In a further aspect of the invention, a system is providing for controlling engine power as a function of vehicle altitude. More specifically, this aspect controls engine power for a turbocharged engine to prevent turbocharger overspeed at high altitude, low ambient air pressure conditions. One form of turbocharged engine is depicted in FIG. 6. This engine is a modification of the engine illustrated in FIG. 2, with like component numbers corresponding to like elements as described above. For example, the engine 46 is provided with fuel through a fueling system 44. The fueling system 44 is controlled by signals along signal path 48 generated by the control computer 30. The control computer 30 receives signals on path 42 from a position signal receiver 20. As discussed in more detail above, the receiver 20 can accept GPS signals from a plurality of geosynchronous satellites.

In addition to the elements discussed previously, the engine includes a turbocharger 200 that includes a compressor 202 and a turbine 204. The compressor 202 includes an air intake 206 that draws in ambient air, compresses the air, and directs the compressed air charge to discharge conduit 208. The discharge conduit 208 can be integrated into the engine air intake manifold in a known manner.

The turbine 204 is driven by exhaust gas discharge from the engine along exhaust conduit 210. In one embodiment, the exhaust conduit 210 can be directly connected to the turbine 204. In the illustrated embodiment, the exhaust gas is first directed through a wastegate valve 212, and ultimately to the turbine through inlet nozzle 214. The flow of exhaust gas drives the turbine 204, which is connected to the compressor 202 by turbine shaft 205. The reduced energy gas is discharged from the turbine at exhaust 216.

In the illustrated embodiment, the wastegate valve 212 is also connected to a wastegate bypass 218 that merges with the turbine exhaust 216. The wastegate valve 212 receives signals on signal path 220 from the control computer 30 that control the opening and closing of the valve. When the valve is closed, all of the engine exhaust is directed to the turbine. Conversely, when the wastegate valve 212 is open, some of the exhaust is directed to the bypass 218 and away from the turbocharger. Preferably, the wastegate valve 212 is a variable position valve capable of diverting controllable amounts of engine exhaust to the bypass 218 or through nozzle 214 to drive the turbocharger.

As is known, the speed of the turbocharger is a function of the mass flow rate of the engine exhaust gas impinging on the turbine 204. This exhaust mass flow rate is itself a function of engine power, so that as engine power increases, exhaust flow increases, and ultimately turbine speed increases. It is also known that the turbocharger rotational speed is inversely related to the ambient air pressure at the compressor intake 206. For a given engine power, an increase in ambient air pressure will cause the turbocharger speed to decrease, while a decrease in air pressure has the opposite effect.

As with any rotating machinery, the turbocharger has a rated limit speed. Rotation above the limit speed can result in a failure of the turbocharger components. Often this failure can be catastrophic. Prior control systems for optimizing turbocharger performance have primarily focused on engine intake manifold pressure and engine speed. Such known systems do not ensure that the turbocharger does not operate beyond its rated limit speed.

Figure 7:
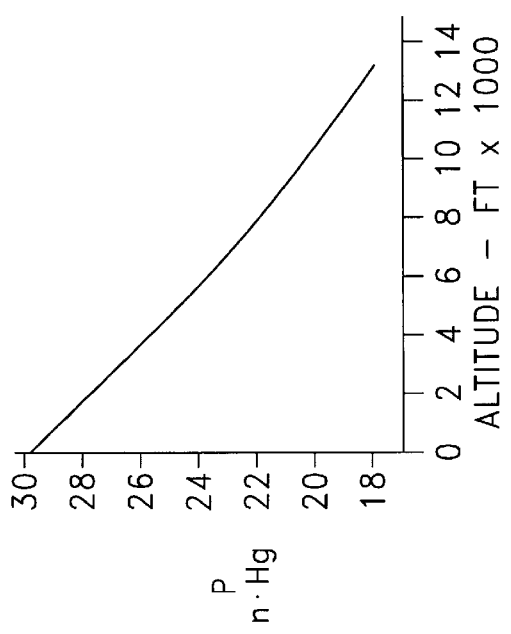
FIG. 7 is a graph of ambient air pressure versus altitude.

In the case of a road vehicle, most of the engine operation will occur at lower altitudes. At elevations below 5000 ft., for instance, the risk of turbocharger overspeed is minimal. As the vehicle ascends to higher elevations, such as while driving through mountainous terrain, the ambient pressure can change substantially. As depicted in the graph of FIG. 7, ambient air pressure can change from 29.92 in.Hg at sea level, to 20.58 in.Hg at 10,000 ft., a change of over thirty percent. Even a 2000-ft. change in elevation results in about a seven-percent change in ambient air pressure.

Figure 8:
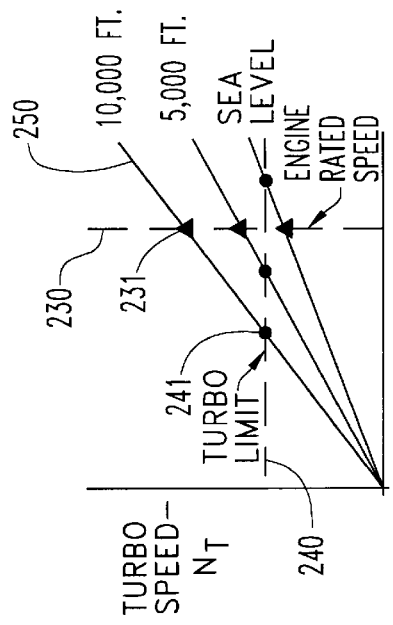
FIG. 8 is a graph of turbocharger speed as a function of engine power and altitude/ambient pressure.

Of course, an engine benefits greatly from a turbocharger when tackling a long uphill grade. It is under these circumstances that the turbocharger is most susceptible to failure—the engine is running at, or even above, its full rated power, and the ambient pressure is decreasing. The graph of FIG. 8 illustrates the relationship of turbocharger speed to engine power and altitude. The graph depicts a line 240 passing through data points 241 corresponding to the limit speed for the turbocharger beyond which failure can occur. Vertical line 230 through points 231 corresponds to the engine rated power. A family of lines 250 shows the increase in turbocharger speed with engine power at different altitudes and ambient air pressures. It is understood that the graph of FIG. 8 is idealized primarily for illustrative purposes only.

It is well known that most engines can operate beyond the rated power or speed, usually at 110 percent of that power/speed. The typical engine and turbocharger are sized and calibrated so that the rated engine speed will not cause the turbocharger to operate beyond its limit speed at a certain calibration altitude, usually sea level. Thus, as depicted in FIG. 8, the turbocharger speed corresponding to the engine rated power or speed at sea level falls well below the turbocharger limit. Moreover, the turbocharger limit speed is sufficiently high to allow the engine to run at its 110 percent limit over a range of elevations above sea level.

When the engine is operating at its rated power and the ambient pressure decreases with altitude, the turbocharger speed increases. At some point, this increase in turbocharger speed exceeds the limit speed, represented by the horizontal line 240.

Considered from another perspective, a maximum engine power (at a rated speed, for example) for each elevation can be determined. Referring still to FIG. 8, the indicia 241 are located at the intersection of the several altitude lines 250 with the horizontal turbocharger limit speed line 240. At sea level, as represented by the rightmost indicia, the engine can be operated well beyond its rated power before the turbocharger reaches its limit speed. As the vehicle altitude increases, the maximum permissible engine power decreases. At 10,000 ft., the leftmost indicia points to a maximum engine speed significantly below the engine rated speed.

Figure 9:
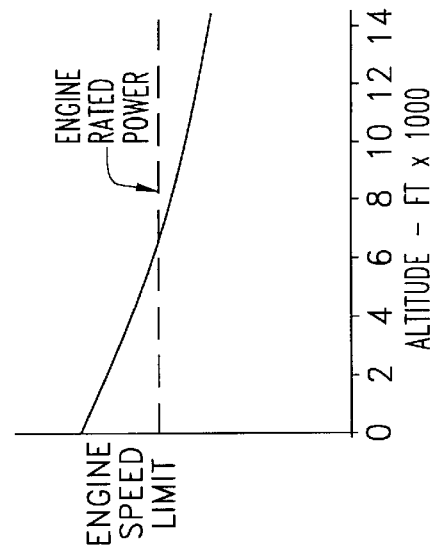
FIG. 9 is a graph of a limit to engine speed as a function of altitude in accordance with the present invention.

This relationship between engine power and altitude to maintain the turbocharger beneath its limit speed is depicted in FIG. 9. Again, the maximum speed at which the engine can be safely operated decreases as altitude increases and ambient air pressure decreases. As indicated above, the graph of FIG. 9 is intended to be illustrative. Consequently, the point at which the altitude curve crosses the engine rated power (or speed) line may vary. The salient point, however, is that at some altitude and air pressure the engine can no longer be operated at full power or at its rated speed without risking a turbocharger failure, or an unacceptable degradation in turbocharger longevity.

With this understanding, the present invention contemplates a system that first accurately determines the altitude of the vehicle. In the most preferred embodiment, the system receives signals at the receiver 20 from a GPS satellite system. The receiver can be configured to receive not only lat-lon data but also altitude data that is accurate to within tens of feet. This vehicle position data, including an altitude signal, is provided to the control computer 30 through signal path 42 or other similar connections.

In accordance with this aspect of the invention, the control computer 30 preferably includes an ambient pressure module 225 that generates an ambient pressure value from the altitude signal. The module 225 can include table look-up software for extracting a pressure value from a table stored in memory, such as memory 66. The table can include hundreds of discrete altitude values with corresponding ambient air pressure values. Alternatively, the ambient pressure module 225 can implement an algorithm, either electronically or using software, that converts the altitude signal to an ambient air pressure value usable by other routines of the control computer 30.

As discussed above, the control computer 30 includes an algorithm for generating fueling commands provided to the fuel system 44 on signal path 48. To accommodate the present feature of the invention, the fueling algorithm is modified to reduce the fueling command, and therefore the engine power, in relation to the ambient air pressure value generated by the module 225. The fueling algorithm can implement this fueling modification in a variety of ways. For instance, a scaling factor can be applied to the fueling command in which the factor is the ratio of the ambient pressure value to the sea level pressure value—e.g., $P_{ambient}/29.92$, for pressure in inches of mercury. Alternatively, the algorithm can utilize a more sophisticated relationship between the ambient air pressure and the reduction of the fueling command, such as a non-linear equation implemented in software.

As a further alternative, the control computer 30 can modify a maximum engine power, speed or torque fueling command parameter maintained in memory 66. The maximum fueling command parameter is preferably an existing value implemented by the control computer to restrict the level of the fueling signal provided to the fuel system 44. This maximum parameter can be scaled as a function of the ratio $P_{ambient}/29.92$ discussed above.

Optionally, the maximum fueling command parameter can be calculated directly within the ambient pressure module 225. Since the turbocharger operating speed has a known relationship to the ambient air pressure, the maximum allowable engine power also has a known relationship to $P_{ambient}$. Likewise, since the fueling command has a known relationship to the engine power, as a function of speed and torque, a predetermined relationship can be developed between altitude or the ambient air pressure and a maximum fueling command parameter. This relationship can be embodied in a table stored in memory 66, or in an algorithm implemented by the module 225 or the control computer 30. Using either approach, the maximum fueling command parameter can be generated and stored in the memory 66 for use by the engine fueling algorithm conducted by the control computer.

In the preferred embodiment, the ambient pressure module 225 operates continuously to receive altitude signal from the receiver 20 and generate engine derating or speed reduction/limiting signals. The invention can be applied in a curative or preventative mode. In the curative mode, the engine power is reduced from its current operating speed when a determination is made that the ambient pressure is low enough relative to the engine power to result in a turbocharger overspeed condition.

However, most preferably the invention is a preventative measure, designed to prevent the turbocharger from ever being placed in conditions likely to produce an overspeed. Thus, the module 225 continuously monitors the ambient pressure and generates the appropriate parameters to limit the engine power according to the altitude.

In an additional embodiment of the invention, the turbocharger speed is controlled using the wastegate valve 212, rather than by limiting the engine power or speed. Since the speed of the turbine 204 is directly proportional to the mass flow through nozzle 214, the speed of the turbocharger 200 can be controlled by limiting the exhaust mass flow received from the engine. In accordance with this embodiment, the wastegate valve is a variable position valve that can control the amount of gas discharged through the engine exhaust 210 that is diverted to the wastegate bypass 218. The wastegate valve 214 receives control signals from the control computer 30 along signal path 220.

In one approach, the wastegate valve control signals are generated by a wastegate control module within the control computer. This module can operate under normal engine operating conditions to control the operation of the turbocharger. For instance, some engine control routines invoke the turbocharger only under certain engine operating conditions. Other wastegate control modules operate to control the turbocharger operation based on compressor/turbine temperature/pressure.

The present invention can be readily integrated into known wastegate or turbocharger control modules to modify the turbocharger control protocol. Since the turbocharger speed is a function of both the ambient pressure and the engine power, the turbocharger or wastegate control modules must consider both parameters. For instance, the turbocharger can operate at full capacity at any altitude and ambient air pressure if the engine is not running at its rated power. On the other hand, the turbocharger can operate at full capacity with the engine at or above its rated power or speed, depending upon the altitude of the vehicle.

Consequently, the turbocharger/wastegate control algorithms may be somewhat more involved than the engine power or speed control protocols discussed above. In one approach, a two-dimensional table can be stored in memory 66 that relates current altitude/ambient air pressure and current engine power to a wastegate control signal. In this approach, the control signal determines the degree of opening of the wastegate valve 212, which in turn determines the proportion of engine exhaust gases discharged through the bypass 218.

Figure 10:
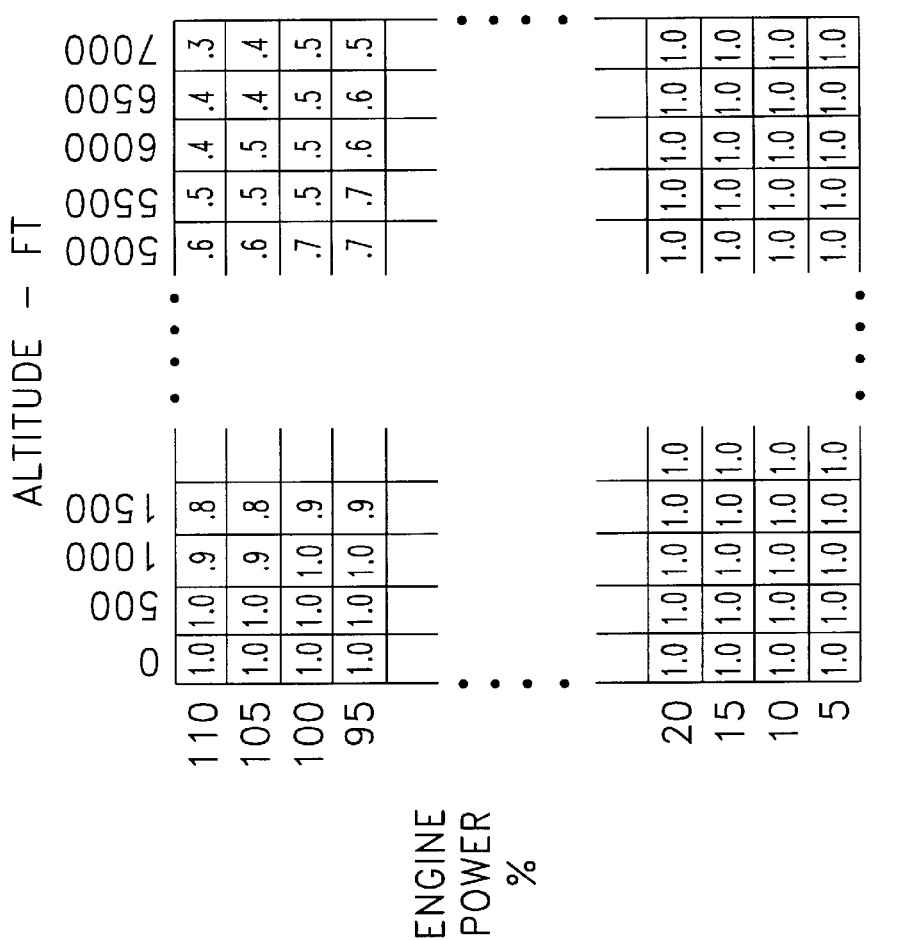
FIG. 10 is a table that relates ambient air pressure and engine power to the degree opening of the waste gate valve.

This table can take the form shown in FIG. 10. As can be seen in the figure, most of the table entries will correspond to a valve open value (1.0), meaning that all engine exhaust passes to the turbocharger. However, at the higher altitudes and lower ambient pressures, the control value is less than full open, being proportionately reduced with increasing engine power and increasing altitude. It is understood that the table of FIG. 10 can define its row entries as a function of engine power, or by the components of power, engine speed and torque.

As with the engine fueling parameter discussed above, generation of the control signal for the wastegate valve 212 can be accomplished using an algorithm implemented by the control computer 30 or the wastegate/turbocharger control module. The algorithm can receive the ambient pressure value from the module 225 and the engine speed from the engine speed sensor 50.

While the invention has been illustrated and described in detail in the foregoing drawings and description, the same is to be considered as illustrative and not restrictive in character, it being understood that only the preferred embodiments have been shown and described and that all changes and modifications that come within the spirit of the invention are desired to be protected. For example, if system 15 includes the optional communications transceiver 68, the base station computer 156 may be used to monitor vehicle travel and load memory 66 with a new set of geographical regions or areas of interest (GA's) when the vehicle enters a new geographical territory, such as new county, state, country or the like.

What is claimed is:

1. A system for controlling fueling of an internal combustion engine of a vehicle according to vehicle altitude, comprising:
    a receiver associated with the vehicle for receiving signals relating to the altitude of the vehicle;
    a fueling system responsive to a fueling signal to provide fuel to the internal combustion engine of the vehicle;
    means responsive to said signals for generating an ambient pressure value as a function of the altitude of the vehicle; and
    means for generating said fueling signal as a function of said ambient pressure value.

2. A system for preventing overspeed of a turbocharger coupled to an internal combustion engine of a vehicle, in which the speed of the turbocharger is related to the power of the engine, and further in which the vehicle includes an engine control module operable to control engine power, the system comprising:
    a receiver associated with the vehicle for receiving an externally transmitted altitude signal indicative of the altitude of the vehicle; and
    means within the engine control module for reducing the engine power when said altitude signal corresponds to an ambient air pressure below a predetermined threshold value.

3. A system for preventing overspeed of a turbocharger coupled to an internal combustion engine of a vehicle, in which the speed of the turbocharger is related to the power of the engine, and further in which the vehicle includes an engine control module operable to control engine power, the system comprising:
    a receiver associated with the vehicle for receiving signals indicative of the altitude of the vehicle; and
    means within the engine control module for limiting engine power to a limit value determined by the altitude of the vehicle.

4. The system for preventing turbocharger overspeed according to claim 3, wherein said means for limiting engine speed includes a processor module implementing an algorithm relating said limit value to the magnitude of said altitude signal.

5. The system for preventing turbocharger overspeed according to claim 3, wherein said means for limiting engine speed includes:
    a memory storing a table relating the magnitude of said altitude signal to an engine fueling value; and
    means for extracting an engine fueling value as said limit value based on the magnitude of said altitude signal.

6. The system for preventing turbocharger overspeed according to claim 3, wherein said receiver is one of a GPS, GLONASS and LORAN-C receiver operable to receive altitude signal from one or more corresponding GPS, GLO-NASSS and LORAN-C transmitters.

7. A system for controlling fueling of an internal combustion engine of a vehicle according to vehicle altitude, comprising:
    a receiver associated with the vehicle for receiving an externally transmitted altitude signal indicative of the altitude of the vehicle;
    a fueling system responsive to a fueling signal to provide fuel to the internal combustion engine of the vehicle; and
    means for generating said fueling signal in relation to said altitude signal.

8. The system for controlling fueling according to claim 7, wherein said receiver is one of a GPS, GLONASS and LORAN-C receiver operable to receive altitude signals from one or more corresponding GPS, GLONASSS and LORAN-C transmitters.

9. The system for controlling fueling according to claim 7, wherein said means for generating said fueling signal includes:
    a control computer operable to derive said fueling signal according to a fueling algorithm; and
    means for modifying said fueling algorithm only if said altitude signal exceeds a predetermined altitude value.

10. The system for controlling fueling according to claim 9, wherein said predetermined altitude value is a function of engine power.

11. The system for controlling fueling according to claim 9, wherein:
    said fueling algorithm incorporates a maximum value limiting said fueling signal provided to said fueling system; and
    said means for modifying said fueling algorithm operates to modify said maximum value in relation to said altitude signal.

12. The system for controlling fueling according to claim 7, wherein said means for generating includes:
    means responsive to said altitude signal for generating an ambient pressure value as a function of the altitude of the vehicle;
    a control computer operable to derive said fueling signal according to a fueling algorithm; and means for modifying said fueling algorithm only if said ambient pressure value falls below a predetermined threshold value.

13. The system for controlling fueling according to claim 12, wherein said control computer includes a memory for storing said threshold value.

14. The system for controlling fueling according to claim 12, in which the engine includes a turbocharger having a limit speed, wherein said threshold value corresponds to an ambient pressure at which the turbocharger operates at said limit speed.

15. The system for controlling fueling according to claim 12, wherein said means for generating an ambient pressure value includes a processor module implementing an algorithm relating said altitude signal to an air pressure value.

16. The system for controlling fueling according to claim 12, wherein said means for generating an ambient pressure value includes:

a memory storing a table relating the magnitude of said altitude signal to an air pressure value; and means for extracting an air pressure value as said ambient pressure value based on the magnitude of said altitude signal.

17. The system for controlling fueling according to claim 12, wherein:

said fueling algorithm incorporates a maximum value limiting the fueling signal provided to said fueling system; and said means for modifying said fueling algorithm operates to modify said maximum value in relation to said ambient pressure value.

* * * * *

UNITED STATES PATENT AND TRADEMARK OFFICE
CERTIFICATE OF CORRECTION

| | | |
|---|---|---|
| PATENT NO. | : 6,151,549 | Page 1 of 1 |
| DATED | : November 21, 2000 | |
| INVENTOR(S) | : Eric B. Andrews et al. | |

It is certified that error appears in the above-identified patent and that said Letters Patent is hereby corrected as shown below:

<u>Title page,</u>
Add the following: Item [73] Assignee: Cummins Engine Company, Inc., Columbus, Indiana. --

Signed and Sealed this

Twenty-fifth Day of September, 2001

Attest:

Nicholas P. Godici

NICHOLAS P. GODICI
*Attesting Officer*     *Acting Director of the United States Patent and Trademark Office*